(12) United States Patent
Duggan et al.

(10) Patent No.: US 6,571,257 B1
(45) Date of Patent: May 27, 2003

(54) EFFICIENT, REAL-TIME MANAGEMENT OF STORAGE RESOURCES

(75) Inventors: Gerald P Duggan, Ft. Collins, CO (US); Ronald E Poppen-Chambers, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 09/589,144

(22) Filed: Jun. 7, 2000

(51) Int. Cl.⁷ ............................................. G06F 17/30
(52) U.S. Cl. ....................... 707/202; 707/200; 707/204; 709/202; 711/124; 711/146
(58) Field of Search ....................... 707/1, 2, 200–206, 707/10; 709/200, 300, 100, 202, 203; 711/146, 124, 156

(56) References Cited

U.S. PATENT DOCUMENTS 5,495,607 A * 2/1996 Pisello et al. ................. 707/10
5,666,532 A * 9/1997 Saks et al. ................... 707/205

* cited by examiner

*Primary Examiner*—Dov Popovici
*Assistant Examiner*—Shireen I Solaiman

(57) ABSTRACT

Apparatus and method for Storage Resource Management (SRM)—i.e., the management of computer storage devices as resources. Methods for Storage Resource Management are described that can be easily and efficiently scaled to computer systems which could include thousands of computers while providing detailed file storage attributes. These methods include three phases: (1) an initialization phase, (2) a data collection phase, and (3) a management server communication phase.

21 Claims, 3 Drawing Sheets

FIG. 2

EFFICIENT, REAL-TIME MANAGEMENT OF STORAGE RESOURCES

FIELD OF THE INVENTION

The present invention relates generally to the management of computer storage infrastructures, and more particularly to the management of storage devices as resources i.e., Storage Resource Management (SRM).

BACKGROUND OF THE INVENTION

Data storage is becoming increasingly important to Information Technology (IT) organizations. Spending on storage, such as disks, tapes, other storage related hardware and software, typically consumes 50% of IT spending. This situation has created a need for software to manage this storage infrastructure particularly in a network environment.

There are two broad categories of software used for storage management: (1) Data Management and (2) Storage Resource Management (SRM). Data Management software focuses on protecting the data stored. This software includes traditional backup applications, as well as other mirroring and replication solutions. SRM software focuses on managing storage devices as resources, independent of the data itself. This software includes capabilities for capacity planning and allocation, logical volume management, and storage related performance monitoring. The present patent document focuses on Storage Resource Management.

One key problem which all SRM applications must contend with is obtaining accurate, timely information about the storage resources attached to a computer. Applications must have information regarding, for example, file ownership by user and application, aggregate usage information for files by user and application, allocation of storage on devices such as high speed disks, mirrored disks, tape, etc., performance, and throughput information, etc. In addition, modem computer systems often include networks of computers which range from only a few to over 10,000 machines. SRM applications need to be able to easily scale between networks of these sizes.

Currently there are two ways in which SRM applications collect information, such as mention above, from a computer. These methods are (1) batch data collection and (2) Operating System (OS) obtained information.

With batch data collection, a process on a computer periodically examines every file on the computer's file system, recording SRM information on a file-by-file basis. The primary advantage of this technique is that it can provide complete information on all the files on a computer. This information can be gathered together to provide aggregate information by user and/or application. But, this technique has some serious disadvantages. First the technique is very slow. Each file on the system must be examined. As a result, the more files a system has, the more time it takes to scan all the files. The fact that it must examine every file means that there will be a significant impact on the performance of the system when the application runs. These performance issues limit the use of this technique to less than a few hundred computer systems which is far short of the true scalable needs. A further limitation of this technique is that it cannot collect performance related information. The data that it collects merely provides a snapshot of the system at specified times. An example of a product which uses batch data collection is "SAME: Vantage" from Sterling Software.

The other technique used to collect SRM related information is to take advantage of information which can be obtained from the Operating System, such as configuration information and data from performance counters. While this technique is very fast and scalable, the types of information it collects are limited. For example, it cannot provide any information on a file-by-file basis. Examples of products that use Operating System information are system tools "Top & Monitor" on HP-UX and the Windows NT "Performance Monitor", as well as High ground's "Storage Resource Manager".

Thus, there is a need for an SRM system which can provide the detailed information which batch data collection techniques do without the associated performance penalties which severely limit the ability to scale of the network in which storage is being managed, while at the same time providing the performance information obtainable from the Operating System.

SUMMARY OF THE INVENTION

The present patent document discloses methods for Storage Resource Management which can be easily and efficiently scaled to computer systems comprising many thousands of computers while providing only detailed file storage attributes. The method disclosed in the present patent document comprises three phases: (1) an initialization phase, (2) a data collection phase, and (3) a management server communication phase.

During the initialization phase, descriptive data, referred to herein as file storage attributes, is collected in order to create a snapshot of the storage layout on every managed host, which could be for example by means of a batch data collection method. The managed hosts are computers, typically attached to a network, whose storage is to be managed.

During the collection phase calls between user applications and the file system are intercepted. Key file data attributes are recorded in a buffer and subsequently read and transferred to a local data repository. The information transferred represents changes to the file system and is merged with the baseline data-set collected during the initialization phase. This merge step ensures that the contents of the local data repository reflect the true state of the file system. The incremental nature of the updates provide a key advantage of the invention - it can provide a real-time view of the file system without having to resort to batch data collection methods.

During the communication phase information is transferred from the local data repository to a storage management application located on a storage management server. The storage management application is responsible for aggregating storage information across multiple managed hosts and presenting results to the system manager.

A primary advantage of the embodiment as described in the present patent document over prior solutions lies in the fact that the system is scalable to systems comprising computers in excess of a few hundred. It collects complete information because it intercepts all calls relating to file operations but has minimal impact on system performance. Following the initialization phase, it does not have to scan each file because it is inserted into the normal flow of file operations from applications to the file system. The system has immediate information regarding any changes to files. Further, it can collect performance information on a per file basis. It is fast and scalable to many systems.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1:
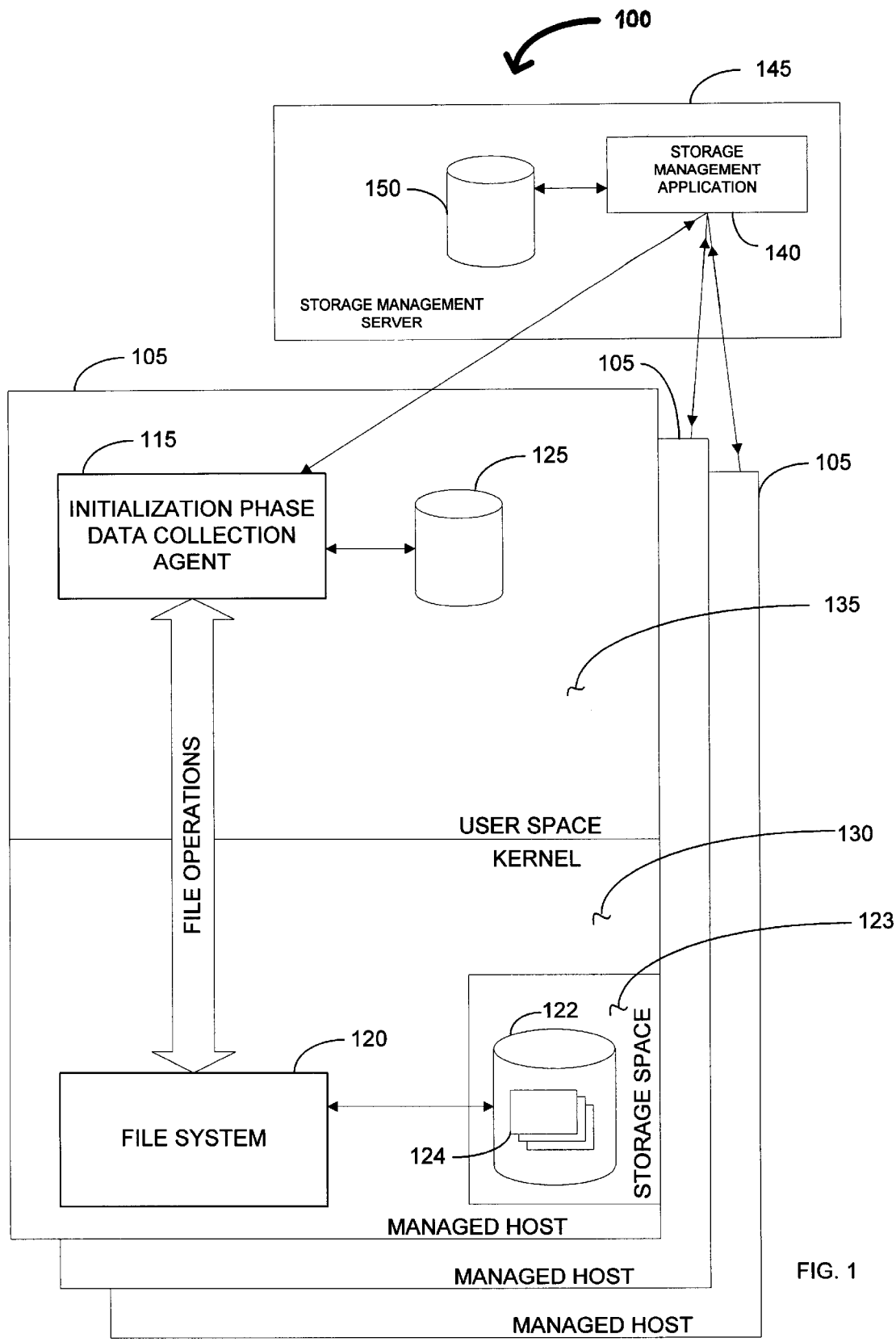
FIG. 1 is a drawing of a storage management system as described in various representative embodiments of the present patent document.

As shown in the drawings for purposes of illustration, the present patent document relates to a novel method for Storage Resource Management (SRM)—i.e., the management of computer storage devices as resources. Previous methods for Storage Resource Management have been practical for use with systems comprising only a few hundred or fewer computers or have been capable of providing only limited information. In the following detailed description and in the several figures of the drawings, like elements are identified with like reference numerals.

The method for Storage Resource Management disclosed in the present patent document comprises three phases: (1) an initialization phase, (2) a data collection phase, and (3) a management server communication phase.

Initialization Phase:

FIG. 1 is a drawing of a storage management system 100 as described in various representative embodiments of the present patent document. As shown in FIG. 1, the storage management system 100 is used to obtain storage information during an initialization phase. During the initialization phase, descriptive data, referred to herein as file storage attributes 101 but not shown in the figures, is collected in order to create a snapshot of the storage layout on every managed host 105, which could be for example by means of a batch data collection method. The managed hosts 105 are computers, referred to herein as first computers 105, attached to a network 110, whose storage is to be managed. The network 110 is not shown explicitly in FIG. 1, but in FIG. 1 the network 110 would connect the managed hosts 105 and a storage management server 145, also referred to herein as a second computer 145. Multiple managed hosts 105 are shown in FIG. 1. The data so collected provides a baseline data set of complete information about each file on the network 110. An initialization phase data collection agent 115, also referred to herein as a first software agent 115, collects data from a file system 120 of its managed host 105 and stores that data in a host SRM data repository 125, also referred to herein as a third data repository 125. The file system 120 is typically located in an operating system kernel 130, whereas the initialization phase data collection agent 115 and the host SRM data repository 125 are located in a user space 135 of the managed host 105.

The file system 120 controls a computer data storage device 122 shown as located in a storage space 123 on the managed host 105. Files 124 stored in the computer data storage device 122 are created, opened, modified, closed, deleted, etc. under the control of the file system 120. While the computer data storage device 122 is shown as a single device in the storage space 123 located on the managed host 105, the file system 120 could control multiple computer data storage devices 122 and computer data storage device 122 could be located and controlled remotely from the managed host 105.

Typically after the initialization phase data collection agent 115 has completed the collection of initial data, the initialization phase data collection agent 115 transfers the data in the host SRM data repository 125 to a storage management application 140 located on the storage management server 145. The storage management application 140 then stores the initialization phase data in a composite SRM data repository 150, also referred to herein as a second data repository 150. The storage management application 140 is responsible for aggregating storage information across multiple managed hosts 105 and presenting results to the system manager. The initialization information in the SRM data repository 125 represents the initialization data from all hosts 105 communicating to the storage management application 140.

Figure 2:
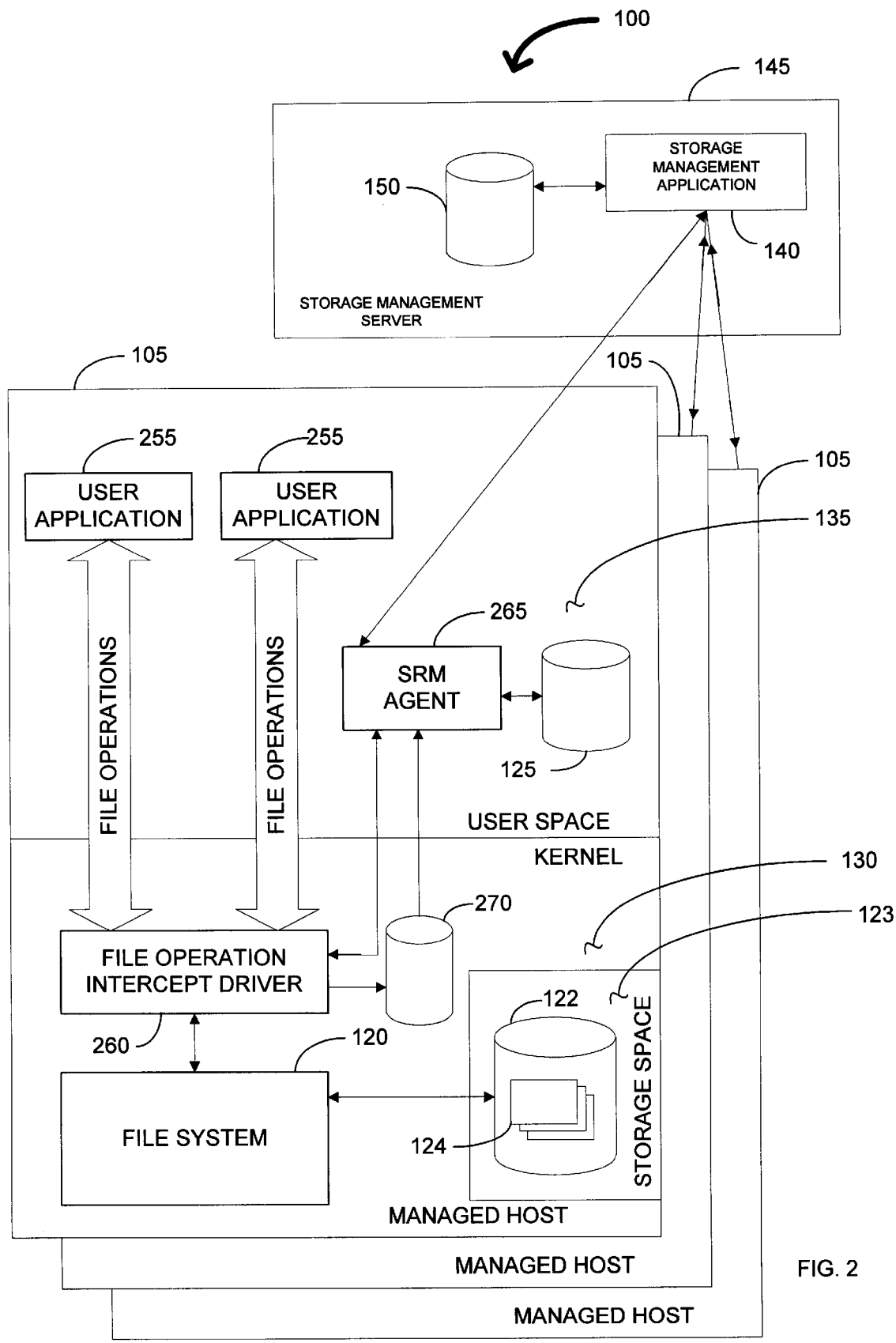
FIG. 2 is another drawing of the storage management system as described in various representative embodiments of the present patent document.

Information Phase:

FIG. 2 is another drawing of the storage management system 100 as described in various representative embodiments of the present patent document. As shown in FIG. 2, the storage management system 100 is used to intercept calls between user applications 255 and the file system 120. The interception of file control calls is performed by a file operation intercept driver 260, also referred to herein as a software driver 260 and as a second software agent 260. Following the initialization phase, an SRM agent 265, also referred to herein as a third software agent 265, which is a software program operating in the user space 135 of the managed host 105, instructs the file operation intercept driver 260 to intercept file operation calls which would change the contents of the file system 120. The file operation intercept driver 260 records key information about these calls in a file operation intercept buffer 270, also referred to herein as a first data repository 270 and as a buffer 270, located in the kernel 130. While the first data repository 270 is typically implemented as a buffer, it could be implemented as any other type of storage mechanism or device. The calls are then passed onto the original file system 120 for processing. When the file is closed the contents of the file operation intercept buffer 270 are transferred to the SRM agent 265. The SRM agent 265 subsequently stores the data into the host SRM data repository 125.

The information transferred to the SRM agent 265 represents changes to the file system 120. The SRM agent 265 merges these changes with the baseline data-set collected during the initialization phase. This merge step ensures that the contents of the host SRM data repository 125 reflect the true state of the file system 120. The incremental nature of the updates provide a key advantage of the invention - it can provide a real-time view of the file system 120 without having to resort to batch data collection methods.

It should be noted that the functions performed by the initialization phase data collection agent 115 could also be performed by the SRM agent 265.

Communication Phase:

As shown in FIG. 2, the storage management system 100 is also used during the communication phase to transfer information from the SRM agent 265 to the storage management application 140 located on the storage management server 145. At various times, the storage management application 140 instructs the SRM agent 265 to transfer this data from the host SRM data repository 125 to the storage management application 140. The storage management application 140 subsequently stores the data in the composite SRM data repository 150 on the storage management server 145. The storage management application 140 is responsible for aggregating storage information across multiple managed hosts 105 and presenting results to the system manager.

Figure 3:
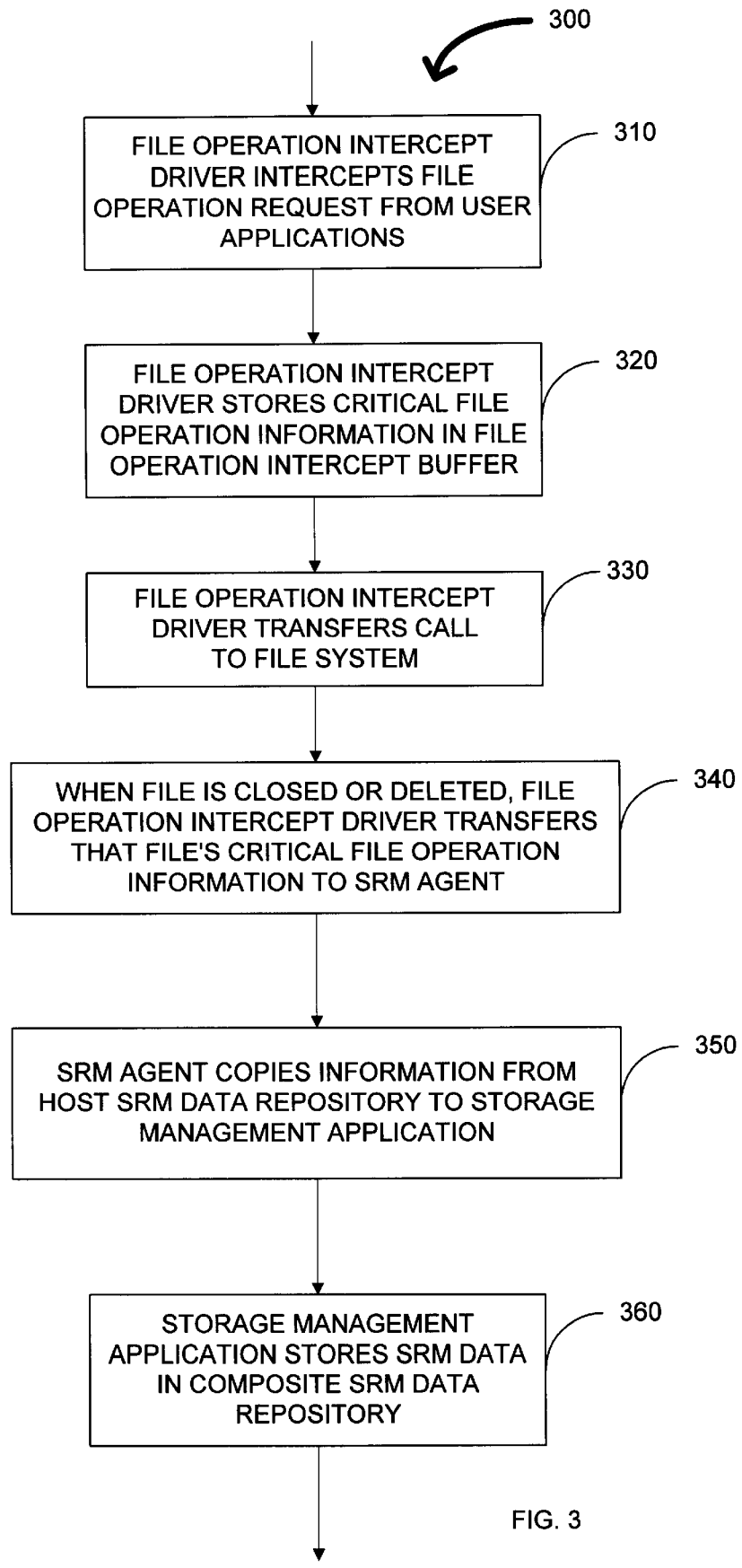
FIG. 3 is a flow chart of the storage management system methods as described in various representative embodiments of the present patent document.

Method Flow Chart:

FIG. 3 is a flow chart of the storage management system 100 methods as described in various representative embodiments of the present patent document. In block 310 the file operation intercept driver 260 intercepts file operation requests from user applications 255. Block 310 then transfers control to block 320.

In block 320 the file operation intercept driver 260 stores critical file operation information to the file operation intercept buffer 270. Block 320 then transfers control to block 330.

In block 330 the file operation intercept driver 260 passes the calls onto the file system 120 for processing. Block 330 then transfers control to block 340.

In block 340 when the file is closed or deleted, the file operation intercept driver 260 transfers that file's critical file information to the SRM agent 265. Block 340 then transfers control to block 350.

In block 350 at various times the SRM agent 265 copies information from the host SRM data repository 125 to the storage management application 140. Block 350 then transfers control to block 360.

In block 360 the storage management application 140 stores the SRM data in the composite SRM data repository 150.

Concluding Remarks:

The system and methods disclosed in the present patent document provide techniques for intercepting calls to the operating system that modify files. These calls are typically open, close, read, write, and file creation. Mechanisms exist on both Windows and Unix Operating Systems that allow applications to intercept such calls. The system records relevant information whenever any of these calls are made and then passes the calls on to the regular file system 120 for processing. At the appropriate time, this information is sent to the storage management server 145 for use by a system wide storage management application 140.

A primary advantage of the embodiment as described in the present patent document over prior solutions lies in the fact that the system is scalable to systems comprising computers in excess of a few hundred. It collects complete information because it intercepts all calls relating to file operations but has minimal impact on system performance. Following the initialization phase, it does not have to scan each file because it is inserted into the normal flow of file operations from applications to the file system. The system has immediate information regarding any changes to files. Further, it can collect performance information on a per file basis. It is fast and scalable to many systems.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A system for managing computer data storage, which comprises:
   a first software agent having capability of obtaining file storage attributes for a plurality of files, wherein the files are stored on a data storage device of a first computer, wherein the files are controlled by a file system, and wherein the file storage attributes are obtained from the file system;
   a second software agent having capabilities of intercepting calls to the file system and obtaining file storage attributes from the calls;
   a first data repository, wherein the second software agent has capability of storing obtained file storage attributes in the first data repository;
   a third software agent, having capability of obtaining file storage attributes from first data repository;
   a storage management application, having capabilities of obtaining file storage attributes from first and third software agents; and
   a second data repository, wherein the storage management application has capability of storing and updating file storage attributes in the second data repository.

2. A system as recited in claim 1, further comprising a third data repository wherein the first software agent has capability of storing file storage attributes in the third data repository.

3. A system as recited in claim 1, wherein the first data repository is a buffer.

4. A system as recited in claim 1, wherein the storage management application is located on a second computer connected to the first computer.

5. A system as recited in claim 4, wherein the first computer and the second computer are connected via a network.

6. A system as recited in claim 1, further comprising at least one additional first computer.

7. A system as recited in claim 6, wherein the storage management application is located on a second computer and wherein the first computers and the second computer are connected via a network.

8. A computer operable method for managing computer data storage, comprising the steps of:
   a first software agent obtaining file storage attributes for a plurality of files, wherein the files are stored on a data storage device of a first computer, wherein the files are controlled by a file system, and wherein the file storage attributes are obtained from the file system;
   a second software agent intercepting calls to the file system and obtaining file storage attributes from the calls;
   the second software agent storing obtained file storage attributes in a first data repository;
   a third software agent obtaining file storage attributes from first data repository;
   a storage management application obtaining file storage attributes from the first software agent;
   the storage management application obtaining file storage attributes from the third software agent; and
   the storage management application storing and updating file storage attributes in a second data repository.

9. A computer operable method as recited in claim 8, which further comprises the step of:
   the first software agent storing file storage attributes in a third data repository.

10. A computer operable method as recited in claim 8, providing the first data repository is a buffer.

11. A computer operable method as recited in claim 8, providing the storage management application is located on a second computer connected to the first computer.

12. A computer operable method as recited in claim 11, providing the first computer and the second computer are connected via a network.

13. A computer operable method as recited in claim 8, further comprising at least one additional first computer.

14. A computer operable method as recited in claim 13, providing the storage management application is located on a second computer and providing the first computers and the second computer are connected via a network.

15. A program storage medium readable by a computer, embodying a software program of instructions executable by the computer to perform method steps for managing computer data storage, comprising:

a first software agent obtaining file storage attributes for a plurality of files, wherein the files are stored on a data storage device of a first computer, wherein the files are controlled by a file system, and wherein the file storage attributes are obtained from the file system;

a second software agent intercepting calls to the file system and obtaining file storage attributes from the calls;

the second software agent storing obtained file storage attributes in a first data repository;

third software agent obtaining file storage attributes from first data repository;

a storage management application obtaining file storage attributes from the first software agent;

the storage management application obtaining file storage attributes from the third software agent; and the storage management application storing and updating file storage attributes in a second data repository.

16. A program storage medium as recited in claim 15, wherein the method steps further comprise:

the first software agent storing file storage attributes in a third data repository.

17. A program storage medium as recited in claim 15, providing the first data repository is a buffer.

18. A program storage medium as recited in claim 15, providing the storage management application is located on a second computer connected to the first computer.

19. A program storage medium as recited in claim 18, providing the first computer and the second computer are connected via a network.

20. A program storage medium as recited in claim 15, further comprising at least one additional first computer.

21. A program storage medium as recited in claim 20, providing the storage management application is located on a second computer and providing the first computers and the second computer are connected via a network.

* * * * *